(12) United States Patent
Gonidec et al.

(10) Patent No.: US 12,378,929 B2
(45) Date of Patent: Aug. 5, 2025

(54) THRUST REVERSER COMPRISING FIXED CASCADES AND A SEALING MEMBRANE

(71) Applicant: SAFRAN NACELLES, Gonfreville-l'Orcher (FR)

(72) Inventors: Patrick Gonidec, Moissy-Cramayel (FR); Loïc CHAPELAIN; Patrick André Boileau, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/726,915

(22) PCT Filed: Jan. 6, 2023

(86) PCT No.: PCT/FR2023/050014
§ 371 (c)(1),
(2) Date: Jul. 5, 2024

(87) PCT Pub. No.: WO2023/131761
PCT Pub. Date: Jul. 13, 2023

(65) Prior Publication Data
US 2025/0101931 A1 Mar. 27, 2025

(30) Foreign Application Priority Data
Jan. 10, 2022 (FR) ...................................... 2200134

(51) Int. Cl.
*F02K 1/72* (2006.01)
(52) U.S. Cl.
CPC ............ *F02K 1/72* (2013.01); *F05D 2260/50* (2013.01); *F05D 2300/601* (2013.01); *F05D 2300/603* (2013.01)

(58) Field of Classification Search
CPC .................................. F02K 1/72; F02K 1/645
See application file for complete search history.

(56) References Cited

U.S. PATENT DOCUMENTS 3,302,404 A    2/1967   Gist, Jr.
3,330,115 A *   7/1967   Markowski ............... F02K 1/68
                                                                                               60/230

(Continued)

FOREIGN PATENT DOCUMENTS

FR   2 981 989 A1   5/2013
FR   3 076 864 A1   7/2019
FR   3 087 848 A1   5/2020

OTHER PUBLICATIONS

International Search Report issued Apr. 19, 2023 in PCT/FR2023/050014 filed on Jan. 6, 2023, 2 pages.

*Primary Examiner* — Ted Kim
(74) *Attorney, Agent, or Firm* — Oblon, McClelland, Maier & Neustadt, L.L.P.

(57) ABSTRACT

A thrust reverser for an aircraft propulsion assembly, including a fixed structure equipped with at least one cascade as well as a radially inner delimiting wall of a secondary vein, and a movable structure including at least one reverser cowling, the cascade being arranged, in the forward direct thrust position, in a housing of the reverser cowling, and, in the retracted thrust reversal position, the wall reveals a passage opening of the secondary vein towards the cascade, the thrust reverser also including at least one sealing membrane designed to deflect at least one portion of the secondary flow. A hook is provided for securing the membrane to a rear cascade support frame, and to the radially inner delimiting wall of the secondary vein.

10 Claims, 11 Drawing Sheets

(56) References Cited

U.S. PATENT DOCUMENTS

| | | | | |
|---|---|---|---|---|
| 3,366,349 | A * | 1/1968 | Rudis | F02K 1/68 60/230 |
| 11,815,046 | B2 * | 11/2023 | Porte | F02K 1/763 |
| 2022/0025832 | A1 * | 1/2022 | Thubert | F02K 1/763 |
| 2022/0243681 | A1 * | 8/2022 | West | F02K 1/72 |

* cited by examiner

THRUST REVERSER COMPRISING FIXED CASCADES AND A SEALING MEMBRANE

TECHNICAL FIELD

The invention relates to the field of nacelles and thrust reversers for aircraft propulsion units, and, more particularly, to the nacelles equipped with fixed cascade thrust reversers.

STATE OF THE PRIOR ART

The thrust reversers are devices allowing diverting the air flow passing through the propulsion unit forward, so as to shorten landing distances and limit the use of the brakes on the landing gear.

The cascade thrust reversers currently used in the aeronautics sector include cascade vanes integrated into a fixed structure of the thrust reverser, intended to be connected to a turbomachine casing. A movable structure of the thrust reverser includes one or more thrust reverser cowls, and it is mounted displaceable in translation relative to the fixed structure between a forward direct thrust position, and a retracted thrust reversal position. In the forward direct thrust position, the cascade vanes are arranged in the housing of the thrust reverser cowls, and they are isolated from the secondary flow path of the propulsion unit by a radially inner wall of the thrust reverser cowls. However, in the retracted thrust reversal position, the retracted radially inner wall of the thrust reverser cowls defines a passage opening from the secondary flow path towards the cascade vanes.

Usually, in order to divert at least one portion of the secondary flow towards this passage opening in the direction of the cascades, the thrust reverser is also equipped with sealing flaps, which, when they are deployed, at least partially seal the secondary flow path. In a known manner, this forces the air from the secondary flow to pass through the passage opening and reach the cascades, which then generate the forward counter-thrust air flow.

The flaps are generally pivotally mounted on the radially inner wall of the thrust reverser cowls, this wall delimiting the secondary flow path radially outwardly. Thus, recesses are provided in this radially inner wall of the thrust reverser cowls in order to receive the sealing flaps in the retracted position, as adopted in direct jet. Nevertheless, in direct jet, the presence of recesses and flaps is a source of aerodynamic disturbances to the secondary flow. In addition, this presence locally limits the installation of an acoustic panel on the radially inner wall of the thrust reverser cowls.

In order to provide a technical solution to these problems, it was proposed to replace the flaps with one or more sealing membranes. Such a design is for example known from document FR 3 076 864 A1.

However, the solutions proposed with sealing membranes remain subject to improvement, in particular in terms of ease of implementation and reliability of deployment, as well as in terms of preserving the acoustic surface attached to the secondary flow path.

DISCLOSURE OF THE INVENTION

The invention firstly relates to a thrust reverser for an aircraft propulsion unit, the thrust reverser comprising a fixed structure equipped with at least one cascade vane as well as a radially internal delimiting wall of a secondary flow path of the propulsion unit intended to be crossed by a secondary flow, the thrust reverser also comprising a movable structure comprising at least one thrust reverser cowl having a housing which is open upstream and delimited between a radially outer wall and a radially inner wall of the thrust reverser cowl, the movable structure being displaceable in translation relative to the fixed structure along a longitudinal central axis of the thrust reverser, between a forward direct thrust position and a retracted thrust reversal position, the cascade vane being arranged, in the forward direct thrust position of the movable structure, in the housing of the thrust reverser cowl being isolated from the secondary flow path by the radially inner wall of the thrust reverser cowl, and, in the retracted thrust reversal position of the movable structure, the retracted radially inner wall of the thrust reverser cowl revealing upstream an opening for passage from the secondary flow path towards the cascade vane, the thrust reverser also comprising at least one sealing membrane designed to divert at least one portion of the secondary flow towards the passage opening and the cascade vane, when the movable structure is in the retracted thrust reversal position.

According to the invention, the thrust reverser comprises first hooking means connecting a first end of the sealing membrane to a rear frame for supporting the cascade vane or to the radially outer wall of the thrust reverser cowl, as well as second hooking means connecting a second end of the sealing membrane to the radially internal delimiting wall of the secondary flow path, at least one portion of the sealing membrane being arranged between the cascade vane and the radially inner wall of the thrust reverser cowl when the movable structure occupies its forward direct thrust position, and the sealing membrane being partially bearing against an upstream end of the radially inner wall of the thrust reverser cowl or upstream and at a distance from this upstream end, when the movable structure occupies its retracted thrust reversal position.

The thrust reverser according to the invention integrates one or more sealing membranes, which confer improved aerodynamic and acoustic performance to the propulsion unit equipped with such a thrust reverser. Indeed, in direct jet, the fabric is housed in the cavity of the sliding cowl, which allows having an external secondary flow path practically or entirely free from any geometric singularity parasitic for the drag, and deleterious for the acoustic treatment.

Furthermore, the specific design of the invention offers a simplicity of implementation of the sealing membrane during the displacement of the movable structure towards its retracted thrust reversal position. It also offers a great deployment reliability of this membrane, whether it is attached to the rear cascade support frame or to the radially outer wall of the thrust reverser cowl. In this regard, it is noted that the sealing membrane, held between the hooking means, bears on the upstream end of the radially inner wall of the thrust reverser cowl preferentially forming an acoustic panel, at least for a portion of the displacement of the cowl sliding backwards. This bearing tightens the membrane, comparable to a canvas.

The invention preferably provides at least one of the following optional technical features, taken in isolation or in combination.

Preferably, the second hooking means comprise cables.

Preferably, the second hooking means comprise connecting rods of which a first end of each of them is mounted on the radially internal delimiting wall of the secondary flow path, preferably via a pivot connection or a ball joint connection.

These connecting rods allow further reinforcing the reliability of deployment of the sealing membrane, in particular by preventing it from remaining pressed inside the housing in the thrust reverser cowl.

Preferably, each connecting rod is designed to be displaced from a protruding position in the secondary flow path, adopted when the movable structure occupies its forward direct thrust position, to a downstream folded position, adopted when the movable structure occupies its retracted thrust reversal position, and, in addition, elastic means push each connecting rod towards its folded position.

Preferably, the aforementioned cables cooperate with the connecting rods, each cable being fastened to a second end of one of the connecting rods associated with this cable, or passing through this associated connecting rod to be fixed on the radially internal delimiting wall of the secondary flow path.

Preferably, the first hooking means comprise a plurality of buttons secured to the first end of the sealing membrane, as well as buttonholes made in the rear frame for supporting the cascade vane, an elastic safety clip being preferably associated with each button to secure the position of the button in the buttonhole. Of course, a reverse design is also possible, with the buttons carried by the rear frame for supporting the cascade vane, without departing from the scope of the invention.

Preferably, each buttonhole is a generally T-shaped slot.

Preferably, the buttons are secured to the first end of the sealing membrane via a circumferential reinforcement cable fastened on this first end of the membrane, or via radial reinforcement cables fastened on the sealing membrane, or even via tabs fastened on the first end of the membrane. In the second case, the radial cables are preferably the same as those of the second previously described hooking means.

In another embodiment, the first hooking means comprise a sheet metal fastened on the rear frame for supporting the cascade vane, and enclosing the first end of the sealing membrane between this support frame and the sheet metal.

Preferably, when the movable structure adopts its forward direct thrust position, the second end of the sealing membrane is pinched between the upstream end of the radially inner wall of the thrust reverser cowl, and a deflection edge belonging to the fixed structure of the thrust reverser.

All features described above apply both to thrust reversers including a single membrane, and to thrust reversers equipped with several sealing membranes specific to the invention, arranged adjacently in a circumferential direction of the thrust reverser.

According to a first possibility mentioned above, the first hooking means connect the first end of the sealing membrane to the rear cascade support frame. According to an alternative, the first hooking means connect the first end of the sealing membrane to the radially outer wall of the thrust reverser cowl, preferably to an end upstream thereof. In this case, the sealing membrane is also partially bearing against a downstream end of the rear frame for supporting the cascade vane, or downstream and at a distance from this downstream end, when the movable structure occupies its retracted thrust reversal position. In this alternative, the sealing membrane is advantageously folded in two on either side of the cascades, in a direct thrust configuration.

The invention also relates to a nacelle for an aircraft propulsion unit, comprising at least one fan cowl, as well as a thrust reverser as described above.

Finally, the invention also relates to a propulsion unit for an aircraft, comprising a turbomachine and such a nacelle.

Other advantages and features of the invention will appear in the detailed non-limiting description below.

BRIEF DESCRIPTION OF THE DRAWINGS

The following detailed description refers to the appended drawings in which.

DETAILED DESCRIPTION OF EMBODIMENTS

Figure 1:
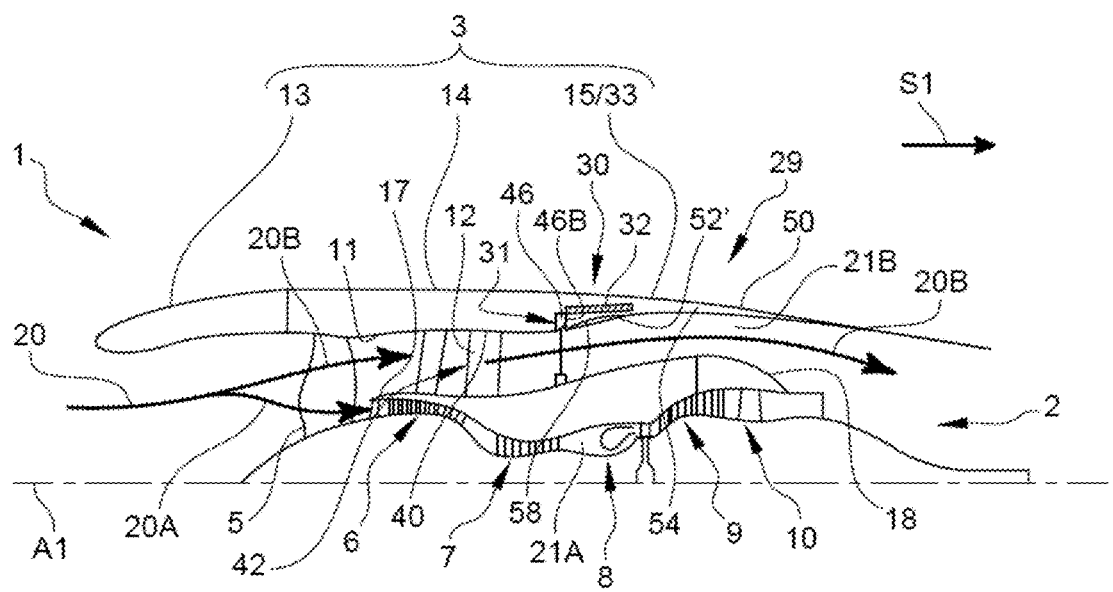
FIG. 1 is a schematic half-view in longitudinal section of a propulsion unit, comprising a thrust reverser represented in the direct thrust configuration.

An aircraft propulsion unit 1 is represented in FIG. 1, having a longitudinal central axis A1.

Subsequently, the terms "upstream" and "downstream" are defined relative to a general direction S1 of flow of gases through the propulsion unit 1, along the axis A1 when it generates a thrust. These terms "upstream" and "downstream" could respectively be substituted by the terms "front" and "rear", with the same meaning.

The propulsion unit 1 comprises a turbomachine 2, a nacelle 3 as well as a mast (not shown), intended to connect the propulsion unit 1 to a wing (not shown) of the aircraft.

The turbomachine 2 is in this example a bypass and twin-spool turbojet engine comprising, from front to rear, a fan 5, a low pressure compressor 6, a high pressure compressor 7, a combustion chamber 8, a high pressure turbine 9 and a low pressure turbine 10. The compressors 6 and 7, the combustion chamber 8 and the turbines 9 and 10 form a gas generator. The turbojet engine 2 is equipped with a fan casing 11 connected to the gas generator by structural arms 12.

The nacelle 3 comprises a front section forming an air inlet 13, a middle section which includes two fan cowls 14 enveloping the fan casing 11, and a rear section 15.

In operation, an air flow 20 enters the propulsion unit 1 via the air inlet 13, passes through the fan 5 then is divided into a primary flow 20A and a secondary flow 20B. The primary flow 20A flows in a primary gas circulation flow path 21A passing through the gas generator. The secondary flow 20B flows in a secondary flow path 21B surrounding the gas generator. The secondary flow path 21B is delimited radially inwardly by a fixed internal fairing which surrounds the gas generator. In this example, the fixed internal fairing comprises a first segment 17 belonging to the middle section 14, and a second segment 18 extending rearwardly from the first segment 17, so as to form a portion of the rear section 15. This second segment 18 is an integral part of a fixed structure of a thrust reverser which will be described below. This same segment will subsequently be called radially internal delimiting wall 18 of the secondary flow path 21B.

Radially outwardly, the secondary flow path 21B is delimited by the fan casing 11, and, in the configuration of FIG. 1, by one or more movable thrust reverser cowls 33 forming a portion of the rear section 15 of the nacelle 3, and which will be described later. More specifically, between the fan casing 11 and the thrust reverser cowls 33, there is provided an outer shroud 40 of an intermediate casing 42, the latter comprising the aforementioned structural arms 12, whose radially outer end is fastened on this shroud 40. This therefore also contributes to delimiting the secondary flow path 21B radially outwardly, being located in the downstream axial extension of the fan casing 11.

The nacelle 3 therefore includes a thrust reverser 30 centred on the axis A1 and comprising, on the one hand, a fixed structure 31 secured to the fan casing 11, and, on the other hand, a structure 29 which is movable relative to the fixed structure 31. The fixed structure 31 includes for example a front frame 46 which fixedly connects it to the fan casing 11, preferably via a knife flange assembly located downstream of the outer shroud 11. This front frame 46 contains a profiled aerodynamic portion called deflection edge 46B, which guides the reverse jet flow.

The fixed structure also includes a plurality of cascade vanes 32 arranged adjacent to each other about the axis A1, in a circumferential direction of the thrust reverser 30 and the propulsion unit 1. Furthermore, the movable structure 29 comprises, in turn, the aforementioned movable thrust reverser cowls 33, for example two cowls 33 each extending over an angular amplitude of approximately 180°. This configuration with two cowls 33 is particularly well suited in the case of a nacelle design in which the cowls/walls 18 are also hingedly mounted, such that the thrust reverser 30 then presents a so-called "D" architecture, known as "D-Duct".

In this architecture, the cowls 18, 33 are connected so as to open/close simultaneously during maintenance operations on the motor. Nevertheless, other architectures are possible, such as for example a so-called "C" architecture, known as "C-Duct", or even a so-called "O" architecture, known as "O-Duct".

Each thrust reverser cowl 33 includes a radially outer wall 50 forming an outer aerodynamic surface of the nacelle, as well as a radially inner wall 52 participating in the delimitation of the secondary flow path 21B radially outwardly. This wall 52 is located in the downstream continuity of the deflection edge 46B. The two walls 50, 52 define a housing 54 open axially at the upstream end of the thrust reverser cowl 33.

FIG. 1 shows the thrust reverser 30 in a forward thrust configuration, called "direct jet", corresponding to a standard flight configuration. In this configuration, the cowls 33 of the movable structure 29 are in a closed position, called forward thrust or "direct jet" position, in which these thrust reverser cowls 33 are supported on the fixed structure 31, in particular on the deflection edge 46B forming an integral part of the latter. Indeed, in the direct thrust configuration, the upstream end 52a of the radially inner wall 52 of each cowl 33 is in axial bearing against the deflection edge 46B.

The movable structure 29 is thus displaceable in translation relative to the fixed structure 31 along the axis A1 of the thrust reverser, between the forward direct thrust position shown in FIG. 1, and a retracted thrust reversal position which will be described later. In the forward direct thrust position of the movable structure 29, the cascade vanes 32 are arranged in the housing 54 of the thrust reverser cowls 33, being isolated from the secondary flow path 21B by the radially inner wall 52 of these sliding thrust reverser cowls 29. This wall 52, forming the outer wall of the secondary flow path, is also called internal acoustic panel.

Figure 2:
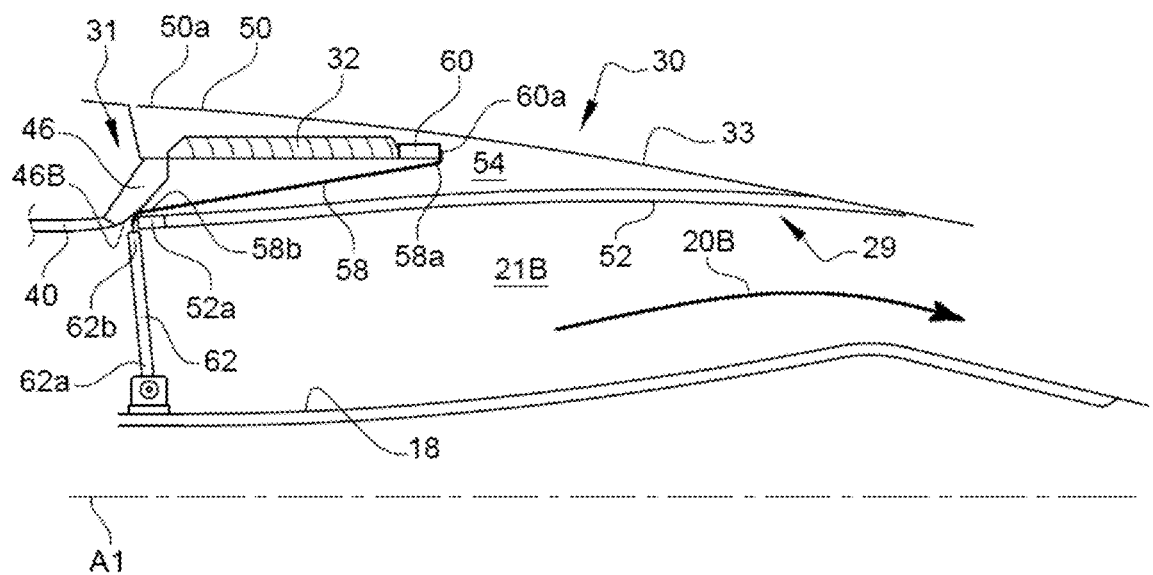
FIG. 2 is a schematic half-view in longitudinal section of the thrust reverser equipping the propulsion unit shown in FIG. 1, with the thrust reverser represented in the direct thrust configuration.
Figure 3:
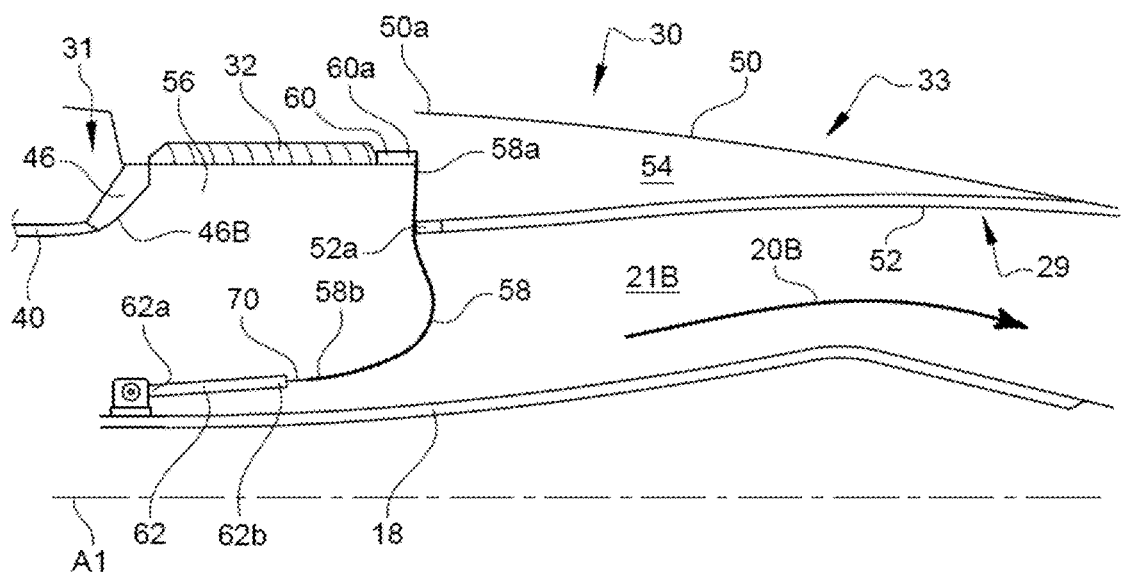
FIG. 3 is a schematic half-view of the thrust reverser shown in FIG. 2, represented in the thrust reversal configuration.
Figure 4:
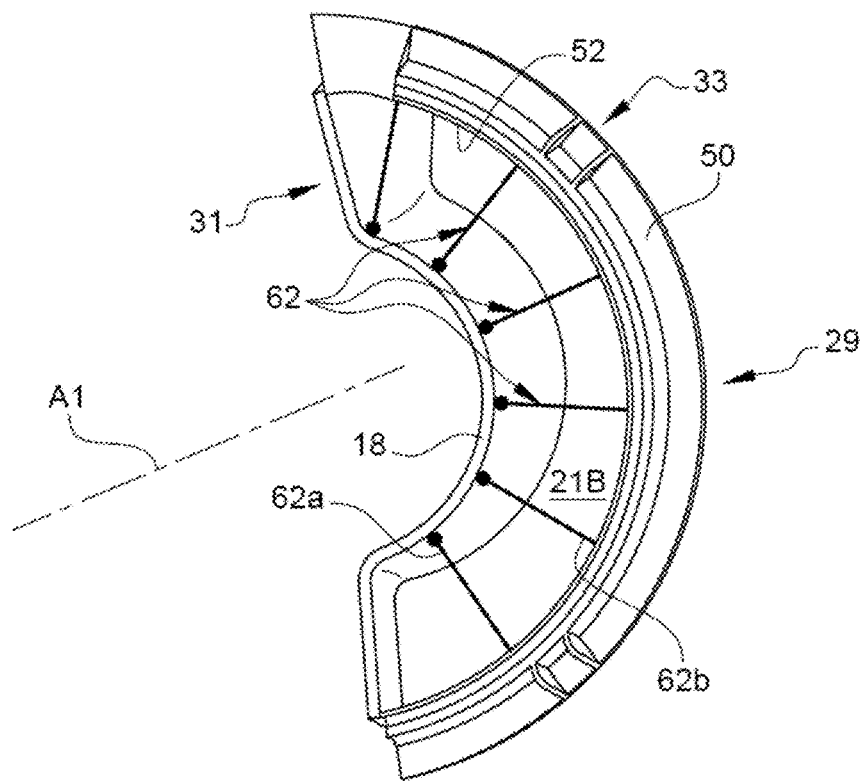
FIG. 4 is a perspective view of the thrust reverser shown in FIGS. 2 and 3, represented in the direct thrust configuration.
Figure 5:
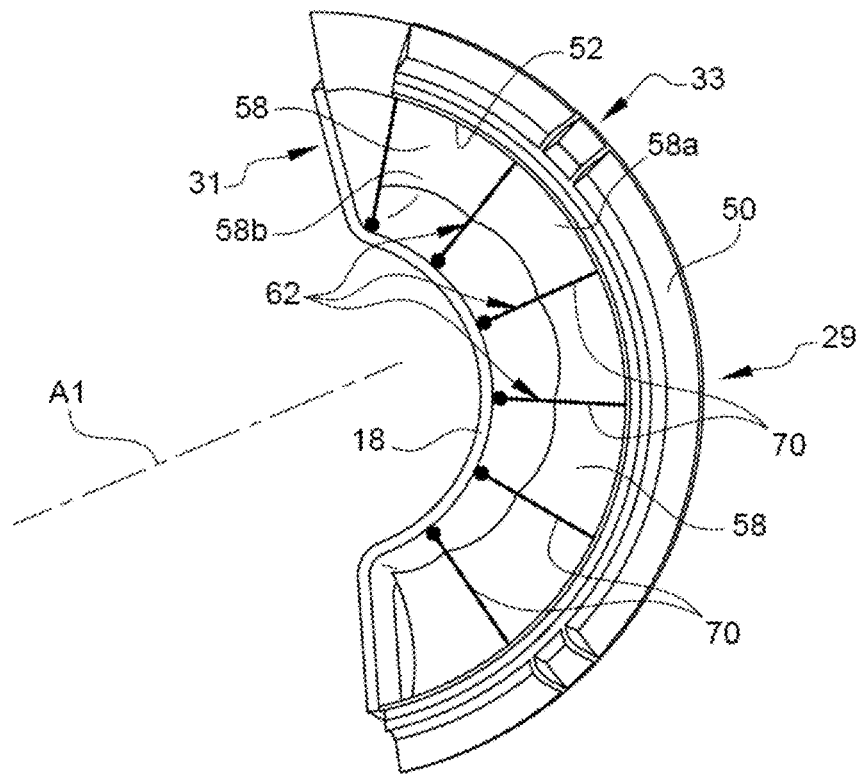
FIG. 5 is a perspective view of the thrust reverser shown in FIG. 4, represented in the thrust reversal configuration.

This direct thrust configuration is also represented in FIGS. 2 and 4, while the retracted thrust reversal position of the movable structure 29 is represented in FIGS. 3 and 5. In FIG. 3, it is shown that the retracted internal acoustic panel 52 of the thrust reverser cowls reveals upstream an opening 56 for passage from the secondary flow path 21B to the cascade vanes 32. The opening 56 is therefore also delimited upstream by the deflection edge 46B, which flares radially outwardly towards the rear, to delimit a flow of air intended to pass through the cascades 32 when the movable system is in this retracted thrust reversal position. In other words, the deflection edge 64 gradually moves away from the axis A1 going from front to rear, to guide/deflect the air towards the cascades 32 in thrust reversal configuration.

In order to deflect at least one portion of the secondary flow 20B towards the passage opening 56 defined axially between the deflection edge 46B and the upstream end 52a of the radially inner wall 52 of each cowl 33, the thrust reverser 30 includes one or several sealing membranes 58. Subsequently, an embodiment will be described in which a single membrane 58 is associated with each thrust reverser cowl 33 having an identical or similar angular amplitude, but it remains possible to provide several circumferentially adjacent membranes associated with each cowl 33. Likewise, only the cooperation between a membrane 58 and the associated cowl 33 thereof will be described below, it being understood that this cooperation is identical or similar for all the cowls of the thrust reverser 33.

The membrane 58 can be made of a material known to the person skilled in the art for this type of application. For example, it may be a non-impregnated fabric, for example aramid fibres. The membrane 58 can also be made using a composite material whose matrix is particularly flexible, for example made of aliphatic polyurethane, which allows the use in different temperature conditions, in particular lower temperatures in the case of an aliphatic polyurethane membrane than in the case of a silicone membrane. The matrix gives a low capacity for recovery in bending and the behaviour of the obtained structure is that of a membrane. One of the major properties of this membrane 58 is to be able to bend in a perfectly reversible manner (elastic or by sliding of fibres) with a very small radius of curvature relative to the surface thereof, and to have a very low thickness, for example in the range of 0.1 to 3 mm. For information purposes, it is observed that this membrane 58 behaves like a boat sail or a parachute/a flying wing when it is pressurised.

One of the particularities of the invention lies in the hooking of the membrane 58 to the thrust reverser 30. To do this, and still with reference to FIGS. 1 to 5, first hooking means are provided connecting a first end 58a of the sealing membrane 58 to a rear frame 60 for supporting the cascades 32, this annular support or in the form of an annular segment indeed connecting the rear end of several adjacent cascades. In addition, second hooking means connect a second end 58b of the sealing membrane 58, opposite to the first membrane 58a, to the radially internal delimiting wall 52 of the secondary flow path. The first and second hooking means will be described below.

Furthermore, as is shown in FIGS. 1, 2 and 4, when the movable structure 29 occupies its forward direct thrust position, at least portion of the sealing membrane 58 is arranged radially between the cascade vanes 32 and the radially inner wall 52 of the thrust reverser cowl 33, in the housing 54. Preferably, the portion of the membrane 58 which is located in this housing 54 of the thrust reverser cowl 33, radially covers the entire length of the cascades 32. As a result, when the movable structure 29 adopts its forward direct thrust position, the second end 58b of the membrane 58 is pinched between the upstream end of the wall 18, and the deflection edge 46B. In order to avoid possible damage to the membrane 58 due to this pinching, the deflection edge 46B can locally have a notch of shape adapted to receive the upstream end 52a of the wall 52. Thus, the membrane 58 is also pressed into this notch of the deflection edge 46B, by the bearing of the upstream end of the wall 52.

Also, as shown in FIG. 3, when the movable structure 29 is displaced and it occupies its retracted thrust reversal position at the end of this displacement, the sealing membrane 58 is partially bearing against the upstream end 52a of the radially inner wall 52 of the thrust reverser cowl, therefore corresponding to the acoustic panel. More specifically, during the rearward displacement of the movable structure 29, the membrane 58 slides on the upstream end 52a of the radially inner wall 52.

Figure 3A:
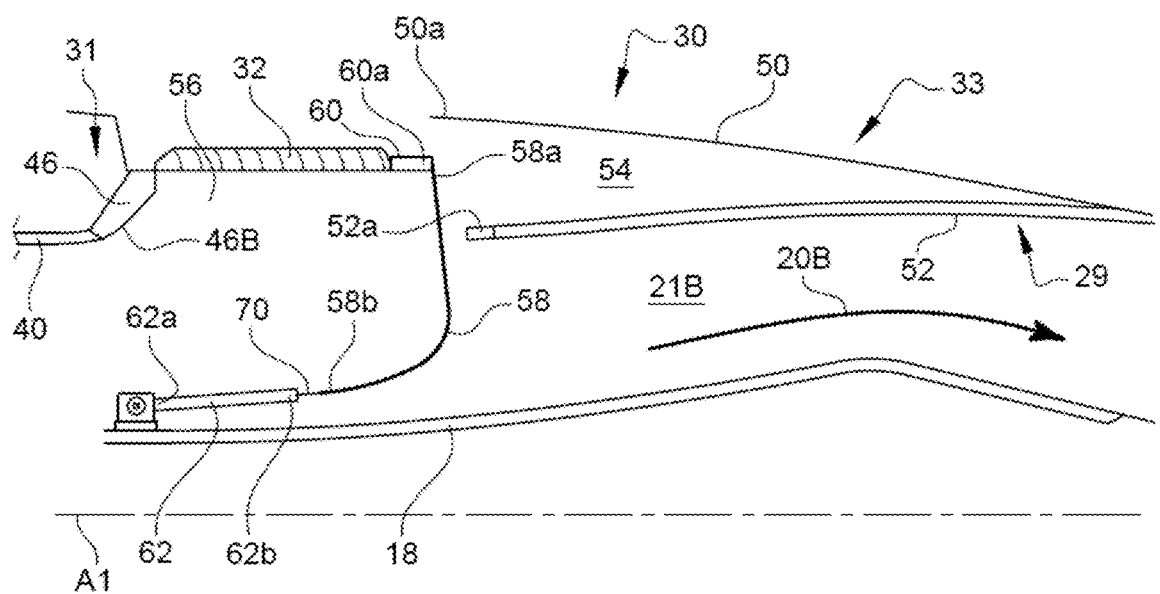
FIG. 3A is a half-schematic view similar to that of the previous figure, with the thrust reverser being presented according to an alternative embodiment.

In the retracted thrust reversal position of FIG. 3, the membrane 58 is therefore in axial bearing downstream against the upstream end 52a. It should be noted that according to the extent of the axial travel of the thrust reverser, the membrane 58 may no longer be in contact with the internal acoustic panel 52 in the fully deployed position of the thrust reverser, where the cowl 33 is in its most retracted position. Such a configuration is shown in FIG. 3A, in which it is clearly shown that the membrane 58 is located upstream and at a distance from the upstream end 52a of the wall 52 of the thrust reverser cowl. The option with contact corresponds to a minimised travel of the thrust reverser, while the option without contact generally corresponds to a smoother membrane shape in reverse jet, therefore more efficient from an aerodynamic point of view.

Thus, the portion of the membrane 58 which is located radially outwardly relative to the bearing zone thereof on the wall 52 seals a portion of the axial opening upstream of the housing 54, while the other portion located radially inwardly seals at least one portion of the secondary flow path 21B, thereby diverting at least one portion of the secondary flow 20B towards the passage opening 56 in the direction of the cascades 32.

Figure 15:
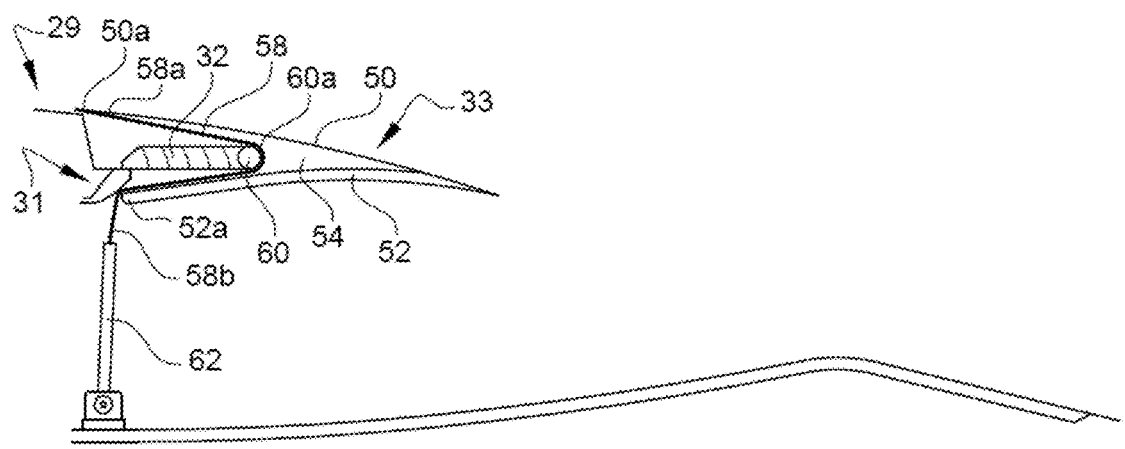
FIG. 15 is a half-schematic view similar to that of FIG. 2, with the thrust reverser being presented according to another preferred embodiment of the invention, and being represented in the direct thrust configuration.
Figure 16:
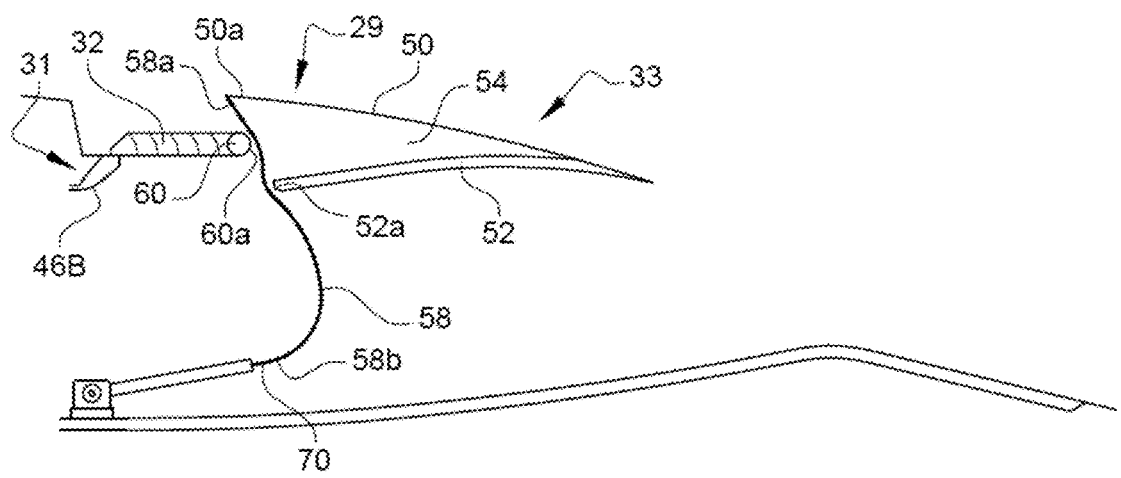
FIG. 16 is a half-schematic view similar to that of the previous figure, with the thrust reverser represented in the thrust reversal configuration.

In another preferred embodiment shown in FIGS. 15 and 16, the radially external hooking of the membrane 58 can be performed on the radially outer wall 50 of the sliding cowl 33. More specifically, first hooking means connect the first end 58a of the membrane at an upstream end 50a of the radially outer wall 50 of the cowl 33. Thus, as shown in FIG. 15, in the direct thrust position, the membrane 58 is housed in the housing 54 by being folded radially on either side of the cascades 32, with a fold defined at the contact zone with the downstream end 60a of the rear frame 60 for supporting the cascades. Furthermore, when the movable structure 29 occupies its retracted thrust reversal position in FIG. 16, the sealing membrane 58 also bears against this downstream end 60a of the rear frame 60, in the same manner as it is also in contact with the upstream end 52a of the wall 52 of the movable cowl. Moreover, these ends 60a, 52a can have a rounded profile to promote the sliding of the membrane 58 during its automatic deployment observed during the displacement of the movable structure 29. In this embodiment also, it is possible that the travel of this movable structure 29 is such that a break in contact between the membrane 58 and the end 60a can be observed, according to the same principle as that exemplified in FIG. 3A relating to the previous embodiment.

In all preferred embodiments, the first solution consists of hooking the end 58b of the membrane 58 to cables 70 connected to the wall 18 (also called IFS, from "Inner Fixed Structure"), by a connection which can advantageously exert a traction force on each cable 70 bringing it towards this wall 18, for example by means of an elastic connection as previously mentioned. The cables 70 themselves can be elastic, for example by using Kevlar® cables, and these same cables can be tensioned when closing the sliding cowl 33. Reinforcements can be integrated into the membrane 58 in the extension of these cables 70, to the external hooking points with the rear cascade support frame 60, or the outer wall 50 of the sliding cowl 33.

These cables 70 are advantageously positioned radially in the flow path while being circumferentially spaced from each other. In the direct jet position, they tension the membrane 58 between the end 58a thereof and the leading edge/the upstream end 52a of the wall 52 of the cowl. During the deployment, when the sliding cowl 33 retracts, the cables 70 pull the membrane 58 towards the secondary flow path so that it takes in air and gradually deploys therein.

Depending on the desired goal, the second hooking means can be constituted by connecting rods 62, instead of the previously mentioned cables. A first end 62a of each of them is mounted on the wall 18, preferably via a pivot or ball joint connection 64 shown in more detail in FIGS. 6 and 7. This connection 64 can be made using a fitting 66 fastened on the fixed wall 18 and cooperating with the first end of the connecting rod 62a.

The connecting rods 62 are spaced circumferentially from each other within the secondary flow path 21B, and their number can for example vary from two to ten.

Figure 6:
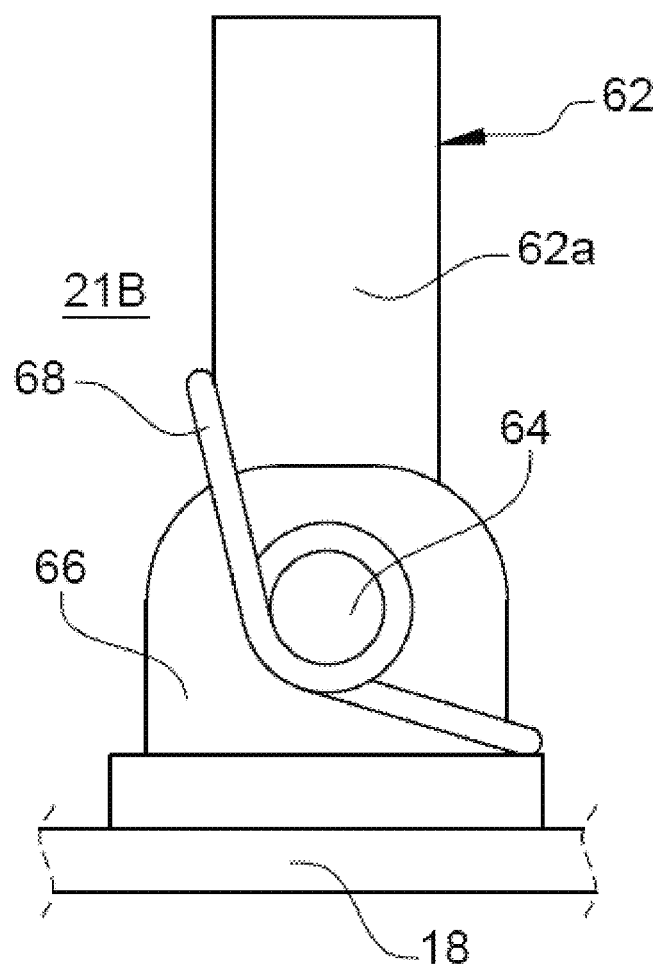
FIG. 6 is a schematic view of one of the connecting rods of the sealing membrane of the thrust reverser shown in the previous figures, with the connecting rod shown in a protruding position as adopted in the direct thrust configuration of the thrust reverser.
Figure 7:
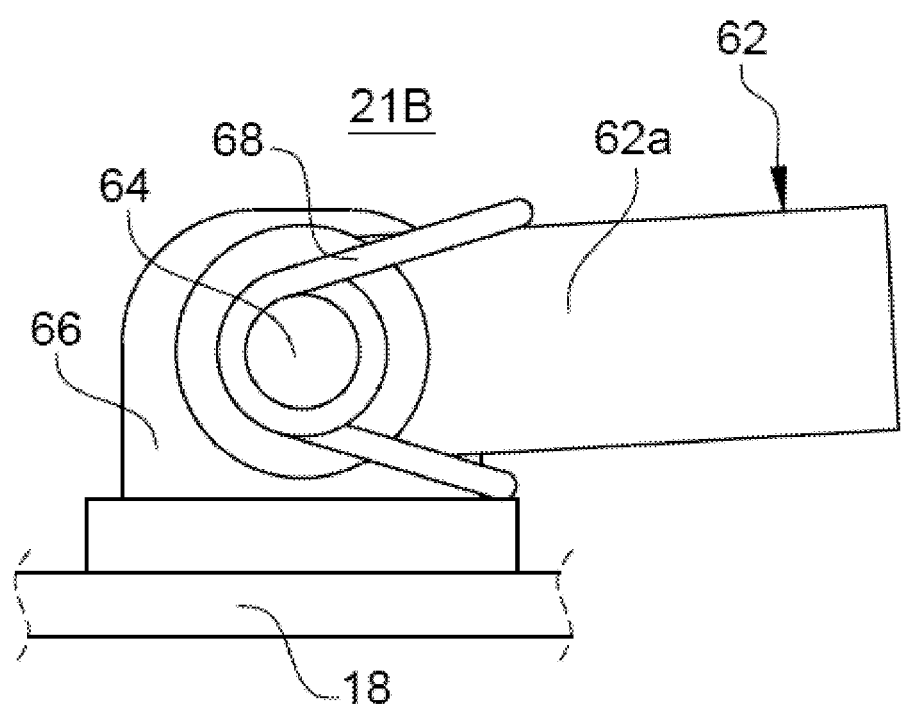
FIG. 7 is a schematic view of the connecting rod shown in FIG. 6, represented in a folded position as adopted in the thrust reversal configuration of the thrust reverser.
Figure 8:
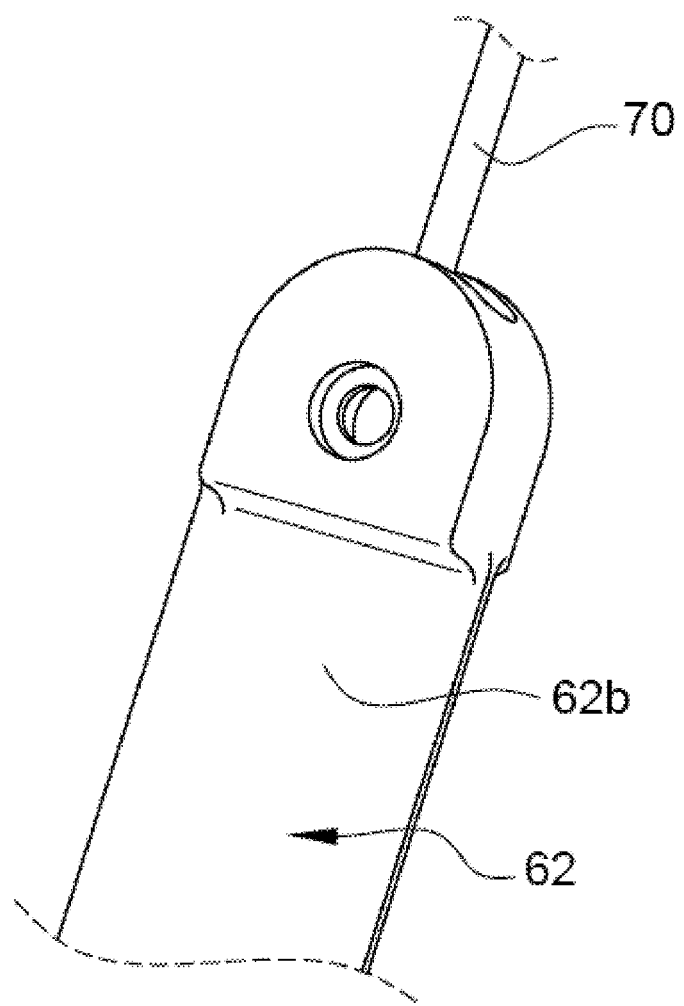
FIG. 8 is a perspective view of the connecting rod shown in FIGS. 6 and 7, in its protruding position.

Each connecting rod 62 is designed to be displaced from a position protruding radially into the secondary flow path 21B, a position shown in FIGS. 2, 4 and 6 and adopted when the movable structure 29 occupies its forward direct thrust position, to a downstream folded position, shown in FIGS. 3, 5 and 7 and adopted when the movable structure 29 occupies its retracted thrust reversal position. In the protruding position, each connecting rod 62 can adopt a radial or substantially radial orientation relative to the axis A1, while in the folded position, each connecting rod can adopt an axial or substantially axial orientation.

Elastic means, called elastic return means 68, tend to tilt each connecting rod 62 towards its folded/lying position in FIG. 7, in particular when the connecting rod is in its protruding position corresponding to the flight position of the thrust reverser. Thus, at the start of deployment of the thrust reverser, each connecting rod 62 exerts on the membrane 58 a rearward and downward thrust which pulls it into the flow path so that the flow which rushes into the cavity 54 at the start of transit does not jam the membrane in this cavity 54 of the fan cowl 33.

The second end 62b of each connecting rod 62, opposite to the first end 62a, can be connected directly to the second end 58b of the membrane 58. Nevertheless, other preferential solutions are retained, such as those aimed at integrating cables or straps of reinforcements within the second hooking means.

It is noted that the connecting rods 62 are axially positioned so that the trajectory of the end 62b thereof is tangent or substantially tangent to the inner surface of the acoustic panel 52 in the front portion thereof, or so that the trajectory is downward in the flow path.

In the embodiment shown in FIGS. 1 to 8, the cables 70 (shown in FIGS. 3 and 8) cooperate with the connecting rods 62 by each being fastened to the second end 62b of one of the connecting rods associated with this cable. Alternatively, the cables 70 could pass through their associated connecting rods 62 to be fastened on the radially internal delimiting wall 52 of the secondary flow path, for example via the fittings 66.

In this regard, it is noted that the cable length is provided to allow a sufficient clearance between the end 62b of the connecting rod and the panel 52, in particular to avoid the risk of mechanical interference between these parts during the phase of folding of the thrust reverser.

Preferably, as is best shown in FIG. 5, the cables 70 then run over the membrane 58, to which they are fastened in a conventional manner to reinforce the mechanical strength of this membrane. These cables or these integrated straps 70 then also fulfil a reinforcing function for the membrane 58, and they are preferably spaced circumferentially from each other, being oriented substantially radially. Still preferably, each cable 70 extends along the membrane 58 from the second end 58b thereof to the first end 58b thereof, possibly going beyond this first end 58b as will be described below.

Figure 9:
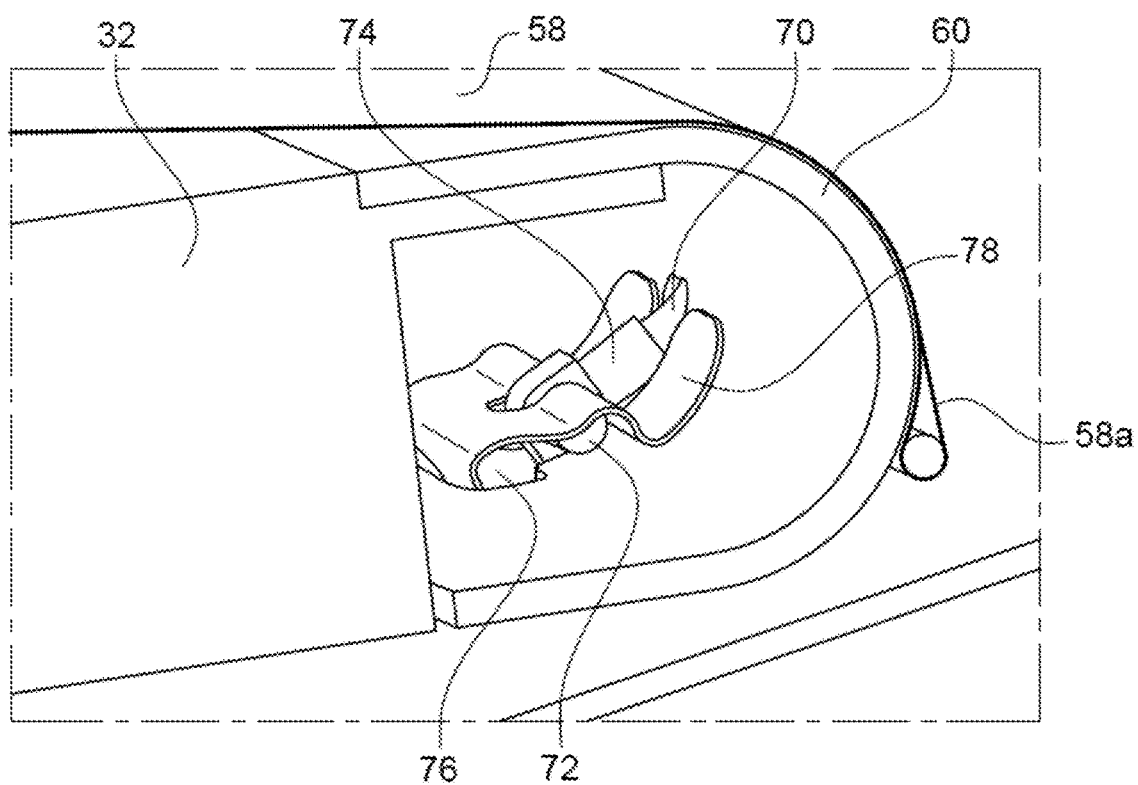
FIG. 9 is a perspective view of the first means for hooking the sealing membrane of the thrust reverser system, according to a preferred embodiment of the invention.
Figure 10:
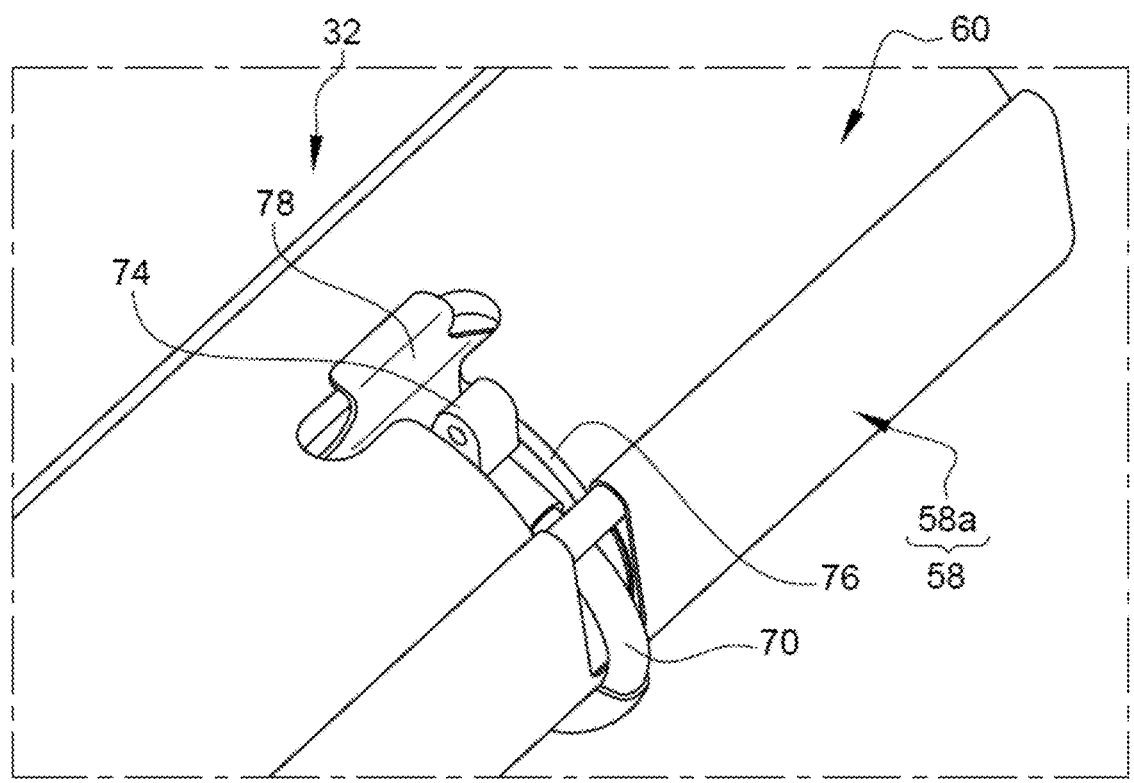
FIG. 10 is a perspective view similar to that of the previous figure, from another angle of view, showing the first means for hooking the sealing membrane.

FIGS. 9 and 10 represent a preferred embodiment for the first hooking means, associated with the first end 58a of the sealing membrane 58. They comprise a plurality of buttons 72 secured to the first end 58a of the membrane 58, and being spaced circumferentially from each other. In each of FIGS. 9 and 10, only one of the buttons 72 is represented. The button 72 takes the form of a short axis oriented circumferentially, and connected to one of the aforementioned radial reinforcement cables 70 via a connecting member 74. The button 72 cooperates with a buttonhole 76 made in the rear cascade support frame 60. The buttonhole 76 corresponds to a generally T-shaped slot through the wall of the rear support frame 60, with the stem of the T oriented substantially axially, and the head thereof oriented substantially circumferentially. The head of the T allows the insertion of the button 72, while the stem of the T ensures its holding in the buttoned configuration shown in FIGS. 9 and 10. In this regard, an elastic safety clip 78 cooperating with both with the buttonhole 76 and with the button 72 is preferably implemented, so as to secure the position of the latter in the buttonhole, and avoid its unwanted extraction outside of it.

Figure 11:
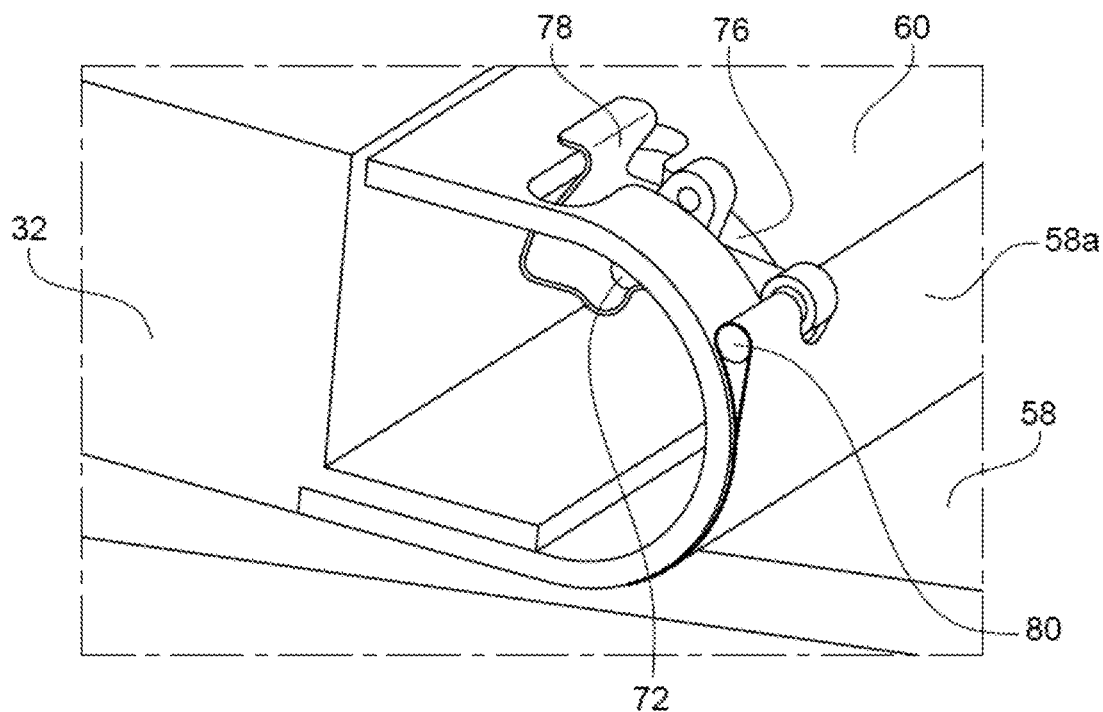
FIG. 11 is a perspective view similar to that of FIG. 9, with the first means for hooking the sealing membrane having a different shape.

In this embodiment, the securing of the button 72 to the first end 58a of the sealing membrane 58 is therefore performed via its connection to the radial reinforcement cable 70 running all along the membrane up to one connecting rods of the second connection means. Other embodiments are nevertheless possible. By way of example shown in FIG. 11, a circumferential reinforcement cable 80 can be fastened on the first end 58a of the membrane, and each button 72 can be connected to this same circumferential cable 80, always via the fitting 76.

Figure 12:
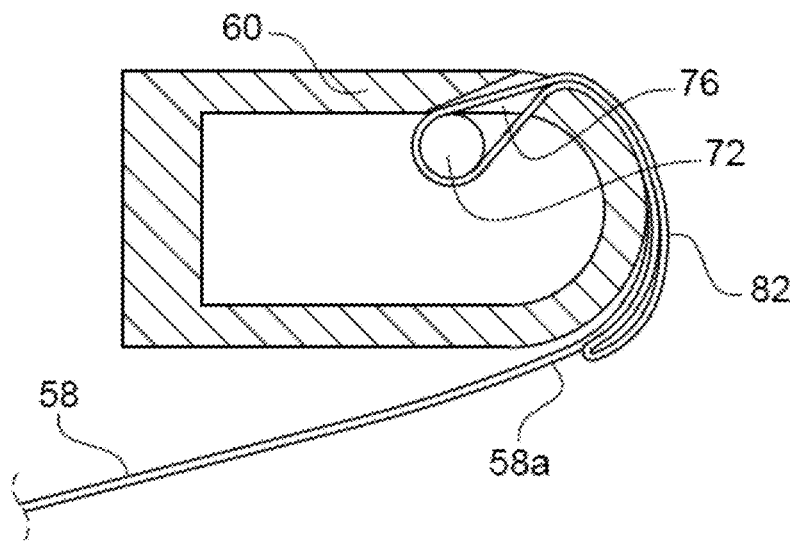
FIG. 12 is a schematic sectional view showing the first means for hooking the sealing membrane, according to yet another embodiment.
Figure 13:
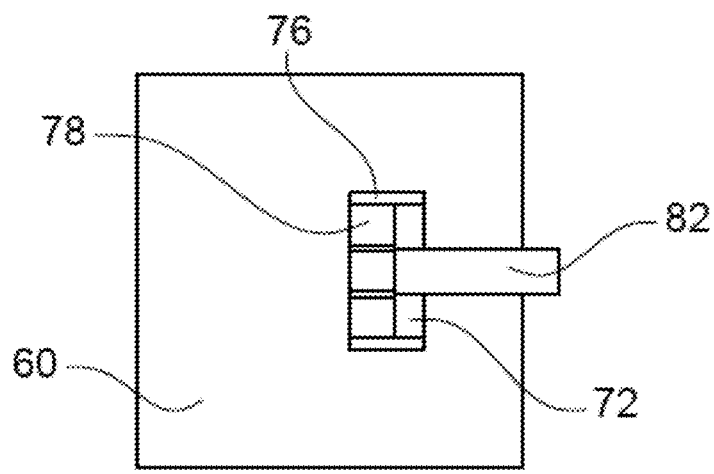
FIG. 13 is a radial view from the outside showing the hooking means of the previous figure.

According to another example shown in FIGS. 12 and 13, the button 72 can be fastened on a tab 82, itself fastened on the first end 58a of the membrane 58. The tab 82 can thus run along and match the rear end of the rear cascade support frame 60, while being connected, on the one hand, to the button 72, and on the other hand, to the first end 58a of the membrane.

Figure 14:
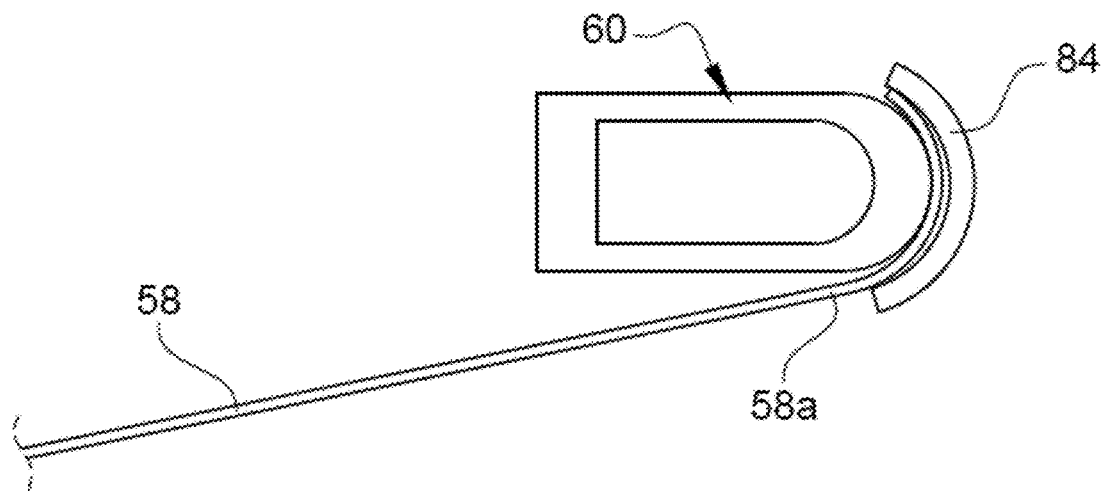
FIG. 14 is a schematic sectional view similar to that of FIG. 12, with the first means for hooking the sealing membrane having yet another shape.

According to another embodiment shown in FIG. 14, the first hooking means comprise a sheet metal 84 fixed to and matching the rear end of the rear cascade support frame 60. The fastening means used for mounting this sheet metal 84 can be of the bolt or rivet type, or other conventional means. This allows enclosing the first end 58a of the sealing membrane 58 between this cascade support frame 60, and the sheet metal 84.

First identical or similar hooking means can be adopted for the embodiment of FIGS. 15 and 16, aimed at connecting the membrane 58 to the upstream end 50a of the wall 50 of the cowl.

On this subject, it is noted that for cascades 32 of current length, the preferred mode of hooking the outer end 58a of the membrane 58 corresponds to that where this end 58a is fastened to the rear cascade support frame 60.

However, in the case of shorter or more compact cascades 32, or if the travel of the cowl 33 during the deployment proves to be much greater than the length of the cascades 32, then it may be wise to hook the end 58a either to the rear support frame 60, but on the radially outer wall 50 of the cowl, and even more specifically on the upstream end 50a of this wall, in the form of a leading edge 60a.

As previously indicated, during the deployment, the membrane 58 slides not only on the upstream end 52a of the internal acoustic panel 52, but also against the rear cascade support frame 60, of rounded shape in order to facilitate the sliding of the membrane 58 during this deployment.

All variants mentioned above, concerning the structure of the membrane 58, remain applicable to this embodiment shown in FIGS. 15 and 16, in which only the hooking point of the membrane end 58a is modified.

Moreover, two variants are possible regarding the positioning of the other membrane end 58b, in the direct jet position.

In the first variant, the end 58b is located slightly radially inwardly relative to the point of contact between the deflection edge 46B, and the leading edge 52a of the acoustic panel 52. According to a second variant, the membrane 58 is sandwiched between the deflection edge 46B and the leading edge 52a of the acoustic panel 52.

Various modifications can be made by the person skilled in the art to the invention which has just been described, solely by way of non-limiting examples, and whose scope is defined by the appended claims. For example, the thrust reverser 30 can alternatively have a "C" or "O" architecture.

The invention claimed is:

1. A thrust reverser for an aircraft propulsion unit, the thrust reverser comprising a fixed structure equipped with at least one cascade vane as well as a radially internal delimiting wall of a secondary flow path of the propulsion unit intended to be crossed by a secondary flow, the thrust reverser also comprising a movable structure comprising at least one thrust reverser cowl having a housing which is open upstream and delimited between a radially outer wall and a radially inner wall of the thrust reverser cowl, the movable structure being displaceable in translation relative to the fixed structure along a longitudinal central axis of the thrust reverser, between a forward direct thrust position and a retracted thrust reversal position, the cascade vane being arranged, in the forward direct thrust position of the movable structure, in the housing of the thrust reverser cowl being isolated from the secondary flow path by the radially inner wall of the thrust reverser cowl, and, in the retracted thrust reversal position of the movable structure, the retracted radially inner wall of the thrust reverser cowl revealing upstream an opening for passage from the secondary flow path towards the cascade vane, the thrust reverser also comprising at least one sealing membrane designed to divert at least one portion of the secondary flow towards the passage opening and the cascade vane, when the movable structure is in the retracted thrust reversal position, wherein the thrust reverser comprises a first hooking means connecting a first end of the sealing membrane to a rear frame for supporting the cascade vane or to the radially outer wall of the thrust reverser cowl, as well as second hooking means connecting a second end of the sealing membrane to the radially internal delimiting wall of the secondary flow path, at least one portion of the sealing membrane being arranged between the cascade vane and the radially inner wall of the thrust reverser cowl when the movable structure occupies its forward direct thrust position, and the sealing membrane partially bearing against an upstream end of the radially inner wall of the thrust reverser cowl or upstream and at a distance from said upstream end, when the movable structure occupies its retracted thrust reversal position.

2. The thrust reverser according to claim 1, wherein the second hooking means comprise connecting rods of which a first end of each of them is mounted on the radially internal delimiting wall of the secondary flow path.

3. The thrust reverser according to claim 2, wherein each connecting rod is designed to be displaced from a protruding position in the secondary flow path, adopted when the movable structure occupies its forward direct thrust position, to a downstream folded position, adopted when the movable structure occupies its retracted thrust reversal position, and wherein elastic means push each connecting rod towards its folded position.

4. The thrust reverser according to claim 1, wherein the first hooking means comprise a plurality of buttons secured to the first end of the sealing membrane, as well as buttonholes made in the rear frame for supporting the cascade vane, an elastic safety clip being associated with each button to secure the position of the button in the buttonhole.

5. The thrust reverser according to claim 4, wherein the buttons are secured to the first end of the sealing membrane via a circumferential reinforcement cable fastened on said first end of the membrane, or via radial reinforcement cables fastened on the sealing membrane, or even via tabs fastened on the first end of the membrane.

6. The thrust reverser according to claim 1, wherein the first hooking means comprise a sheet metal fastened on the rear frame for supporting the cascade vane, and enclosing the first end of the sealing membrane between said support frame and the sheet metal.

7. The thrust reverser according to claim 1, wherein when the movable structure adopts its forward direct thrust position, the second end of the sealing membrane is pinched between the upstream end of the radially inner wall of the thrust reverser cowl, and a deflection edge belonging to the fixed structure of the thrust reverser.

8. The thrust reverser according to claim 1, wherein the first hooking means connect the first end of the sealing membrane to an upstream end of the radially outer wall of the thrust reverser cowl, and wherein the sealing membrane is also partially bearing against a downstream end of the rear frame for supporting the cascade vane or downstream and at a distance from said downstream end, when the movable structure occupies its retracted thrust reversal position.

9. A nacelle for an aircraft propulsion unit, comprising at least one fan cowl, as well as a thrust reverser according to claim 1.

10. A propulsion unit for an aircraft, comprising a turbomachine and a nacelle according to claim 9.

* * * * *